US008258203B2

(12) United States Patent
Held et al.

(10) Patent No.: US 8,258,203 B2
(45) Date of Patent: Sep. 4, 2012

(54) INKJET INK, INK SET AND METHOD OF USING SAME

(75) Inventors: Robert Paul Held, Newark, DE (US); C. Chad Roberts, Wilmington, DE (US); Gregory R. Schulz, Mt. Pleasant, SC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 184 days.

(21) Appl. No.: 11/643,169

(22) Filed: Dec. 21, 2006

(65) Prior Publication Data

US 2008/0151027 A1   Jun. 26, 2008

(51) Int. Cl.
C09D 11/00    (2006.01)

(52) U.S. Cl. ...... 523/160; 523/161; 347/100; 106/31.86

(58) Field of Classification Search .......... 523/160, 523/161; 524/505
See application file for complete search history.

(56) References Cited

U.S. PATENT DOCUMENTS

| 5,022,592 A | 6/1991 | Zakheim et al. |
| 5,026,427 A | 6/1991 | Mitchell et al. |
| 5,085,698 A | 2/1992 | Ma et al. |
| 5,141,556 A * | 8/1992 | Matrick .......... 524/385 |
| 5,310,778 A | 5/1994 | Shor et al. |
| 5,679,138 A | 10/1997 | Bishop et al. |
| 5,734,403 A | 3/1998 | Suga et al. |
| 5,852,075 A | 12/1998 | Held |
| 5,891,231 A | 4/1999 | Gnerlich et al. |
| 5,976,232 A | 11/1999 | Gore |
| 6,075,069 A * | 6/2000 | Takemoto ....... 523/160 |
| 6,156,384 A * | 12/2000 | Hutter et al. ...... 427/288 |
| 6,354,693 B1 | 3/2002 | Looman et al. |
| 6,874,881 B2 * | 4/2005 | Suzuki et al. ........ 347/100 |
| 2003/0089277 A1 | 5/2003 | Zakheim et al. |
| 2005/0090599 A1 | 4/2005 | Spinelli |

FOREIGN PATENT DOCUMENTS

EP   1 125 994 B1   8/2001

* cited by examiner

*Primary Examiner* — Doris Lee

(74) *Attorney, Agent, or Firm* — John H. Lamming; Simon L. Xu

(57) ABSTRACT

The present invention pertains to a black inkjet ink comprising aqueous vehicle and carbon black pigment stabilized to dispersion by a certain block copolymer dispersant. The invention further pertains to an ink set comprising this black ink and at least a second ink which contains a reactive species capable of destabilizing the carbon black dispersion. Still further, the invention pertains to a method of printing wherein the black ink and second ink are printed in an overlapping relationship, thereby minimizing penetration, feathering and/or bleed of the black pigment and improving print quality.

12 Claims, No Drawings

INKJET INK, INK SET AND METHOD OF USING SAME

BACKGROUND OF THE INVENTION

The present invention pertains to an aqueous inkjet ink comprising carbon black pigment stabilized by a certain block copolymer dispersant. The invention further pertains to an ink set comprising this ink and to a method of printing with the ink set.

Inkjet printing is a non-impact printing process in which droplets of ink are deposited on a substrate, such as paper, to form the desired image. The droplets are ejected from a printhead in response to electrical signals generated by a microprocessor.

Most inkjet printers are equipped with an ink set comprising two or more different inks and are able to print black text and multicolor images. Typically, an ink set will comprise at least a cyan, magenta and yellow colored ink and a black ink (CMYK ink set).

For printing text, it is desirable for the black ink to have high optical density. For this purpose, a pigment colorant is most advantageous, especially a carbon black pigment. A pigment colorant is not soluble in the ink vehicle and must be treated in order to cause it to remain stably dispersed and jet properly.

To effect stable dispersion, pigments are commonly treated with dispersants, and a wide variety of such materials have been disclosed. Especially effective are block copolymer dispersants which are described, for example, in U.S. Pat. No. 5,085,698. Other examples include benzylmethacrylate (BZMA)//methacrylic acid (MAA) 13//10 block copolymer with number average molecular weight (Mn) of 2966 disclosed in U.S. Pat. No. 5,852,075 and benzylmethacrylate (BZMA)//methacrylic acid (MAA) 13//3 block copolymer with number average molecular weight (Mn) of 2522 disclosed in U.S. patent publication US2005/0090599.

For CMYK ink sets comprising a pigment black ink, it is known to print the black ink in an overlapping relationship with one or more of the colored inks to improve the print quality of the black ink when the one or more colored ink(s) are formulated with an ingredient that destabilizes the black pigment dispersion. Such ink sets and printing method are disclosed for example in U.S. Pat. Nos. 5,734,403 and 6,354,693, and in European Patent Publication 1,125,994 A1.

Despite the successful inkjet inks and print methods presently available, there is still a need for, and it is an objective of this invention to provide, inks and methods having even better print quality and jetting reliability.

SUMMARY OF THE INVENTION

In one aspect, the present invention, pertains to a black inkjet ink comprising an aqueous vehicle and a carbon black pigment wherein said carbon black pigment is stabilized to dispersion in said aqueous vehicle by a polymeric dispersant which polymeric dispersant is block copolymer comprising an A block and a B block wherein, said A block is a segment consisting of 2 to 8 units of methacrylic acid;

said B block is a segment comprising at least 2 units of methacrylic acid and at least 16 units of benzylmethacrylate with the proviso that, said block copolymer has a number average molecular weight (Mn) of between about 3,000 and 16,000 Daultons and an acid number of between about 50 and 220 (mg KOH/g polymer solids).

In another aspect, the present invention pertains to an inkjet ink set comprising a first and second ink wherein the first ink is a black ink as prescribed above and the second ink is an aqueous ink comprising a reactive species. A reactive species is a material capable of destabilizing the carbon black dispersion, examples of which include, but are not limited to, soluble inorganic salts and polyfunctional amines such as polyethyleneimine, polyallyl amine. The amines can be in protonated form by combination with strong acids such as mineral acids.

In yet another aspect, the present invention pertains to a method of inkjet printing on a substrate, comprising the steps of:

(a) providing an ink jet printer that prints in response to digital data signals;
(b) loading the printer with a substrate to be printed;
(c) loading the printer with an ink jet ink set comprising a first and second ink as set forth above; and
(d) printing said first and second ink on the substrate, in an overlapping or/and abutting relationship to each other.

In a preferred embodiment the first and second inks are printed in an overlapping relationship to each other wherein the second ink is printed under the first ink. Preferably, the optical density of the printed area is higher when the second ink is printed under the first ink, than if the first ink is printed alone, without any overlap with the second ink.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Black Ink

The black ink prescribed herein comprises aqueous vehicle, carbon black pigment and optionally other ingredients.

The ink vehicle is the liquid carrier (or medium) for the colorant(s) and optional additives. The term "aqueous vehicle" refers to a vehicle comprised of water or a mixture of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or an 1,2-alkanediols. Glycol ethers include, for example, ethylene glycol monobutyl ether, diethylene glycol mono-n-propyl ether, ethylene glycol mono-iso-propyl ether, diethylene glycol mono-isopropyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. The 1,2-alkanediol penetrants include linear, for example, 1,2-(C5 to C8)alkanediols and especially 1,2-pentanediol and 1,2-hexanediol.

An aqueous vehicle will typically contain about 50% to about 96% water with the balance (i.e., about 50% to about 4%) being the water-soluble solvent/humectant.

Raw carbon black pigment is insoluble and non-dispersible in the ink vehicle and must be treated in order to form a stable dispersion. According to the present invention, the carbon black pigment is stabilized to dispersion in the aqueous vehicle by treatment with a block copolymer dispersant having two blocks (or segments), an A block and a B block. The A block, is a homopolymer segment consisting of 2 to 8 units of methacrylic acid. The B block is a copolymer segment comprising at least 2 units of methacrylic acid and at least 16 units of benzylmethacrylate. By "units", it is meant monomer units as will be apparent to those skilled in the art. The overall polymer has a number average molecular weight (Mn) of between about 3,000 and 16,000 Daultons and an acid number (mg KOH needed to neutralize 1 gram polymer solids) of between about 50 and 220. In a preferred embodiment, the number average molecular weight (Mn) is between about 4,000 and 12,000 Daultons. In another preferred embodiment, the acid number is between about 75 and 200. The weight ratio of pigment to dispersant (P/D) is typically between about 0.5 and 5. The acid groups on the dispersant polymer will typically be partially or completely neutralized with base to the salt form. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri-methylamine, morpholine, N-methylmorpholine), organic alcohol amines (N,N-dimethylethanolamine, N-methyl diethanolamine, mono-, di-, tri-ethanolamine), ammonium salts (ammonium hydroxide, tetra-alkyl ammonium hydroxide), and pyridine.

Sources of carbon black pigment are well known to those of ordinary skill in the art. Likewise, methods of making block copolymers are known and include, for example, those methods described in U.S. Pat. Nos. 5,085,698 and 5,852,075, and U.S. patent publication US2005/0090599 herein before referenced.

Controlled polymerization techniques such as Group Transfer Polymerization (GTP) or Reversible-Addition Fragmentation Transfer (RAFT) polymerization are preferred because polymers produced thereby have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight.

To prepare the dispersion, the pigment and dispersant are premixed and then dispersed or deflocculated in a milling step. The premixture includes an aqueous carrier medium (such as water and, optionally, a water-miscible solvent) when the milling step involves a wet milling operation. The milling may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592, 5,026,427, 5,310,778, 5,891,231, 5,679,138, 5,976,232 and U.S. patent publication 2003/0089277. The pigment dispersion as made is typically in a concentrated form (dispersion concentrate), which is subsequently diluted with a suitable liquid containing the desired additives to make the final ink.

The range of useful particle size after dispersion is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The levels of pigment employed in formulated inks are those levels needed to impart the desired optical density to the printed image. Typically, pigment levels are in the range of about 0.01 wt % to about 10 wt %, and more typically from about 1 wt % to about 9 wt %.

Other ingredients, additives, may be formulated into the inkjet ink, to the extent that such other ingredients do not interfere with the stability and jettability of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5 wt % and more typically in amounts of no more than 2 wt %.

Polymers may be included in the ink as an additive to improve durability of printed image and/or enhance the printer performance of the inks. These polymers may be added to the ink up to about 10 wt % with 5 wt % being typical depending on impact on performance. Suitable polymers include acrylic copolymers, polymer latexes from emulsion polymerization, and polyurethane dispersions. As with the dispersants mentioned herein before, polymer additives preferably originate from a controlled polymerization techniques such as Group Transfer Polymerization (GTP) or Reversible-Addition Fragmentation Transfer (RAFT) polymerization. Block copolymers are particularly useful for improving durability of the printed image while maintaining excellent print performance. Polymer additives can include the free addition of the same polymer used as the dispersant.

Biocides may be used to inhibit growth of microorganisms.

Pigmented ink jet inks typically have a surface tension in the range of about 20 mN·m$^{-1}$ to about 70 mN·m$^{-1}$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink is particularly suited to lower viscosity applications. Thus the viscosity (at 25° C.) of the inventive inks can be less than about 7 mPa·s, or less than about 5 mPa·s, and even, advantageously, less than about 3.5 mPa·s.

Method of Printing and Ink Sets Therefore

Inkjet ink sets comprise at least two different inks which are used in combination to create the desired image. A typical printer will generally comprise at least four differently colored inks such as a cyan, magenta, yellow and black (CMYK) ink. Ink sets may further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets may include one or more colorless inks which are printed in combination with the colored inks to enhance properties such as optical density, chroma, durability and/or gloss.

According to one embodiment of the present invention, there is provided an ink set comprising a first ink and a second ink wherein the first ink is a black ink as prescribed herein above and the second ink comprises an aqueous vehicle and reactive species that can destabilize the carbon black dispersion of the black ink. When the first and second ink are printed in an overlapping relationship, the reactive species destabilizes the carbon black dispersion thereby immobilizing the pigment in place and minimizing penetration, feathering and bleed. The immobilization of the carbon black pigment by the reactive species in the second ink is usually most effective when the overlap relationship of the inks comprises printing the second ink under ("underprinting") the first ink.

The second ink can be colored or colorless. In a preferred embodiment, the second ink is colored and most preferably a cyan, magenta or yellow ink in a multicolor ink set. Preferably, a colored second ink comprises a dye colorant which, by definition, is soluble in the ink vehicle. The second vehicle may be the same or different than the first vehicle and is subject to similar compositional considerations as that herein before described for the black ink.

The selection of colorant for the second ink is well understood by one skilled in the art. Examples of useful dyes include but are not limited to include (cyan) Acid Blue 9 and Direct Blue 199; (magenta) Acid Red 52, Reactive Red 180, Acid Red 37 and Reactive Red 23; and (yellow) Direct Yellow 86, Direct Yellow 132 and Acid Yellow 23. The preceding dyes are referred to by their "C.I." designation established by Society Dyers and Colourists, Bradford, Yorkshire, UK and published in the The Color Index, Third Edition, 1971.

The reactive species can be any suitable species such as, for example, a soluble inorganic salt and/or a polyamine compound. In a preferred embodiment, inorganic salt is selected from group of soluble salts of $Li^+$, $Na^+$, $K^+$, $Rb^+$, $Cs^+$, $Mg^{2+}$, $Ca^{2+}$, $Sr^{2+}$, $Ba^{2+}$, $Zn^{2+}$, $Cu^{2+}$ and any combination thereof. Most preferred are salts of multivalent metals. In another preferred embodiment, polyamine is selected from polyethyleneimine and/or polyallyl amine. The amines can be in protonated form by combination with strong acids such as mineral acids. The level of reactive species present in the second ink is a level effective for destabilizing the pigment dispersion in the first ink and is a matter of routine optimization.

More than one ink in the ink set may contain reactive species. For example, in a CYMK ink set, two or all three of the CYM inks may comprise reactive species and any or all of these reactive species-containing inks may be used to overlap the black ink.

According to yet another aspect of the present invention there is provided a method of ink jet printing onto a substrate using the inventive ink set comprising the prescribed first and second ink wherein one or more regions of the substrate are printed with the first ink and second ink in an overlapping relationship. In a preferred embodiment, the inks are overlapped by printing the second ink under the first ink. Also preferably, the optical density of the overlapped region(s) is higher that if the first ink comprising carbon black pigment is printed alone without overlap of the second ink.

Ink jet printing methods where a black pigment ink is overlapped with a colored second ink comprising reactive species have been described, as noted in the background herein before provided. In addition, commercial printers are available with a print mode that underprints a black pigment ink with colored ink. Two such commercial printers are the Deskjet 6450 printer from Hewlett Packard and the PIXMA iP5000 printer from Canon.

The inks of the present invention can be printed with any suitable inkjet printer, including printers equipped with piezo or thermal printheads. The substrate can be any suitable substrate including plain paper, such as common electrophotographic copier paper; treated paper, such as photo-quality inkjet paper. The present invention is particularly advantageous for printing on plain paper.

The following examples illustrate the invention without, however, being limited thereto.

EXAMPLES

In the following examples, unless otherwise stated, water was deionized and ingredient amounts are in weight percent of the total weight of ink. Surfynol® 465 is a surfactant from Air Products (Allentown, Pa. USA). Proxel™ GXL is a Biocide from Avecia (Wilmington, Del., USA). Glycereth-26, is a 26 mole ethylene oxide adduct of glycerin.

Dispersion Preparation

The dispersant polymers used to make the dispersions were synthesized by established methods as described, for example, in U.S. Pat. Nos. 5,085,698. U.S. and U.S. Pat. No. 5,852,075 and U.S. patent publication US2005/0090599, the disclosures of which are incorporated by reference herein as if fully set forth. Monomer content and other dispersant properties are summarized in the table of dispersions. Each of the polymers was neutralized with KOH to a pH of between 7.5 and 9.0.

With each dispersant, carbon black pigment dispersions were prepared by milling (bead mill, 0.5 mm YTZ® grinding media) a premix slurry of about 20-24% pigment, dispersant polymer (pigment/dispersant, P/D, weight ratio of 2.5) and water. Grind time was about 4 hours after which the dispersion was filtered through a 0.3 micron Pall filter to separate the media and remove any large particles. The recovered dispersion was diluted with water to yield a final dispersion of about 15 wt % pigment.

The dispersions made, 1-9 and A-D, are summarized in the following table according to the dispersant used. The acid number (mg KOH/g polymer solids) reported for the B block (AN B block) and for the overall polymer (AN total) is the theoretical value.

| Disp. | Dispersant MAA//BzMA/MAA/ETEGMA | Polymer MW | AN B Block | AN Total |
|---|---|---|---|---|
| 1 | 2//30/13/0 | 6656 | 110 | 134 |
| 2 | 2//30/11/5 | 7715 | 80 | 108 |
| 3 | 2//22/9/0 | 4900 | 103 | 137 |
| 4 | 4//22/7/0 | 4900 | 80 | 137 |
| 5 | 4//30/11/0 | 6656 | 92 | 134 |
| 6 | 4//30/11/5 | 7888 | 78 | 114 |
| 7 | 4//30/8/5 | 7630 | 59 | 96 |
| 8 | 4//30/20.5/0 | 7417 | 154 | 191 |
| 9 | 7//30/8/0 | 6656 | 67 | 135 |
| A | 4//13/2/0 | 2900 | 39 | 136 |
| B | 10//30/5/0 | 6656 | 42 | 135 |
| C | 0//26.1/3.7/0 | 5000 | — | 85 |
| D | 0//22/8.5/0 | 4689 | — | 114 |

Ink Preparation

Inks were prepared by stirring together the pigment dispersion and other ink ingredients according to the same general formulation summarized in the following table. The dispersion was added in an amount that provided 4% pigment solids in the final ink.

| Ingredient | Weight % |
|---|---|
| Dispersion (as wt % pigment) | 4 |
| Diethyleneglycol | 3.6 |
| Glycerol | 3.4 |
| Trimethylolpropane | 3 |
| Glycereth-26 | 2 |
| Surfynol ® 465 | 0.5 |
| Proxel ™ GXL | 0.2 |
| Water (to 100%) | Balance |

Print Testing and Evaluation

The black inks were printed with a Canon iPIXMA iP5000 (settings: plain media; high print quality; grayscale off). Optical density measurements (Gretag Macbeth SpectroEye, made by G retag Macbeth AG, Regensdorf, Switzerland), for each black ink were made on areas with underprinting and areas without underprinting. The ink used for underprinting was commercially available Canon BCI-1201C cyan ink which contains magnesium nitrate.

Print Quality was rated by visual examination. Multiple pages of a test pattern containing lines, solids and text, were printed. A good rating was given if the print was sharp and crisp, there were no missing nozzles, and there was no deterioration of these qualities observed from the first to the tenth page printed. A poor rating was given if the print was not sharp and crisp or if there were missing nozzles or if the print quality visibly deteriorated between first and tenth page printed. As sharpness deteriorates, text becomes difficult to read and the line edges become fuzzy.

Results

The print test results for each ink are summarized in the following table.

| Ink | Dispersant | OD - No underprint | OD with underprint | Print Quality |
|---|---|---|---|---|
| 1 | 2//30/13/0 | 1.13 | 1.37 | good |
| 2 | 2//30/11/5 | 1.17 | 1.39 | good |
| 3 | 2//22/9/0 | 1.08 | 1.38 | good |
| 4 | 4//22/7/0 | 1.12 | 1.36 | good |
| 5 | 4//30/11/0 | 1.17 | 1.41 | good |
| 6 | 4//30/11/5 | 1.11 | 1.37 | good |
| 7 | 4//30/8/5 | 1.12 | 1.38 | good |
| 8 | 4//30/20.5/0 | 1.03 | 1.33 | good |
| 9 | 7//30/8/0 | 1.12 | 1.39 | good |
| Comparative Inks | | | | |
| A | 4//13/2/0 | 1.01 | 1.22 | good |
| B | 10//30/5/0 | 1.04 | 1.22 | good |
| C | 0//26.1/3.7/0 | 1.36 | 1.43 | poor |
| D | 0//22/8.5/0 | 1.18 | 1.40 | poor |

As shown, comparative inks C and D with random polymer dispersant give high optical density but poor print quality. Comparative B with a block copolymer dispersant having a large A block gives good print quality but low optical density. Likewise, comparative ink A with a block polymer dispersant that is too low in molecular weight gives good print quality but low optical density. The inventive inks with the prescribed dispersants are advantageous for providing good print quality and high optical density, especially when underprinted. Optical density differences of about 0.05 units are typically discernible to the average viewer and it is generally desirable for black regions such as text, for example, to be as dark (high an optical density) as possible.

The invention claimed is:

1. An ink set comprising:
 a first ink and a second ink, wherein said first ink is a black ink-jet ink consisting of a first aqueous vehicle, a polymeric dispersant and a carbon black pigment, wherein said carbon black pigment is stabilized to a carbon black dispersion in said first aqueous vehicle by said polymeric dispersant and wherein said polymeric dispersant is a block copolymer comprising an A block and a B block, wherein
 said A block consists of 2 to 8 units of methacrylic acid or salt form thereof;
 said B block comprises at least 2 units of methacrylic acid, or salt form thereof, and at least 16 units of benzylmethacrylate;
 said block copolymer has a number average molecular weight (Mn) of between about 3,000 and 16,000 Daultons and an acid number of between about 50 and 220; and
 wherein said second ink comprises a second aqueous vehicle and reactive species that can destabilize the carbon black dispersion of said first ink, and said first ink is underprinted with said second ink and has an optical density of equal to or greater than 1.30, provided that said second ink does not contain a nonionic dispersant.

2. The ink set of claim 1 wherein the reactive species comprises a polyamine selected from the group of polyethyleneimine, polyallylamine and protonated forms thereof.

3. The ink set of claim 1 wherein reactive species is an inorganic salt and/or a polyamine compound.

4. The ink set of claim 3 wherein the reactive species comprises an inorganic salt that is soluble in said second aqueous vehicle.

5. The ink set of claim 4 wherein the inorganic salt is selected from group of soluble salts of $Li^+$, $Na^+$, $K^+$, $Rb^+$, $Cs^+$, $Mg^{2+}$, $Ca^{2+}$, $Sr^{2+}$, $Ba^{2+}$, $Zn^{2+}$, $Cu^{2+}$ and any combination thereof.

6. The ink set of any claim 1-5 wherein the second ink further comprises a colorant.

7. The ink set of claim 6 wherein the colorant in said second ink is a dye.

8. The ink set of claim 1, wherein said B block comprises between 5 and 25 units of methacrylic acid.

9. The ink set of claim 8, wherein the total number of units of methacrylic acid in said A block and said B block is equal to or less than 15.

10. The ink set of claim 9, wherein said B block consists of methacrylic acid and benzylmethacrylate.

11. The ink set of claim 9, wherein said B block further comprises 2-(ethyoxytriethylenglycol) methacrylate (ETEGMA).

12. The ink set of claim 11, wherein said B block consists of methacrylic acid, benzylmethacrylate, and 2-(ethyoxytriethylenglycol) methacrylate (ETEGMA).

* * * * *